March 29, 1927.
L. R. NELSON
NOZZLE
Original Filed June 9, 1924
1,622,733
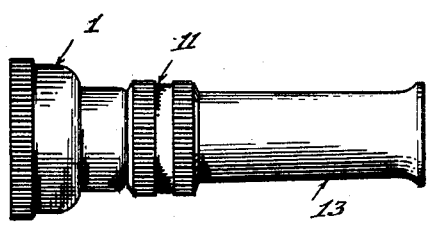
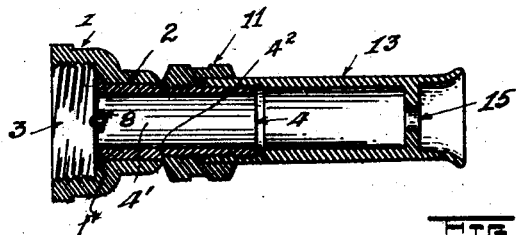
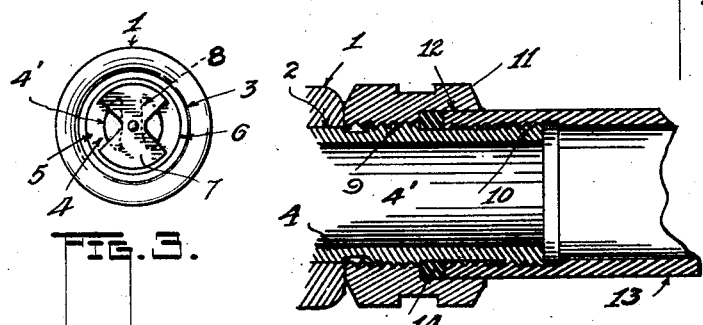
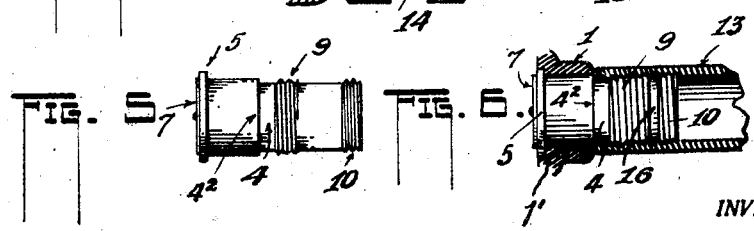
INVENTOR.
L.R.Nelson,
BY
ATTORNEY.

Patented Mar. 29, 1927.

1,622,733

UNITED STATES PATENT OFFICE.

LEWEN R. NELSON, OF PEORIA, ILLINOIS.

NOZZLE.

Application filed June 9, 1924, Serial No. 718,722. Renewed February 10, 1927.

This invention relates to improvements in hose nozzles. An object of my invention is to provide a construction quite simple together with a simplified manner of its assembly.

Another object is to provide a construction by which the machining operations in producing a hose nozzle may be simplified and wherein the usual required extreme accuracy of such operations is unnecessary and wherein, also, short lengths of material otherwise wasted, or which would have to be worked over into new stock, may be used.

Still another object is to improve upon the structure of my Patent No. 1,006,450 issued to me on October 17, 1911, for a nozzle by providing means for securing the parts of a nozzle in assembled relation as will be pointed out herein.

To the end that the invention may be understood in all its details the accompanying drawing has been provided wherein:

Figure 1 is a side elevation of my improved nozzle.

Figure 2 is a longitudinal section of the same.

Figure 3 is an elevation of that end of the nozzle adapted for attachment to a hose.

Figure 4 is a longitudinal section of a portion of the nozzle shown in Figure 3 produced on a much larger scale, and Figure 5 is a side elevation of part of the nozzle shown in Figures 2 and 3 produced on the same scale as those figures.

Figure 6 shows a slight rearrangement of the nozzle parts.

The nozzle includes the usual fitting 1 having a bore 2, a shoulder 1', and a threaded larger bore 3, the latter adapted for receiving the male member of a hose, not shown. The bore 2 receives a tubular part 4 clearly shown in Figure 5, the said part having at one end an annular flange 5 extending beyond the periphery thereof adapted to seat in a recess 6 in said fitting 1 between the bore 2 and the larger threaded bore 3 described. The said tubular part lies in a smooth turning fit in the said fitting 1. A valve 7 of substantially the form shown in Figure 3 overlies the bore 4' of the part 4, being pivoted at its center to a cross-member 8 formed with said part 4. But this last named structure is shown in my patent above referred to and in itself, therefore, is not new herein.

Outward from the fitting 1 the part 4 is provided with spaced threaded zones 9 and 10, Figure 5, and a nut or sleeve 11 internally threaded for substantially one-half its length engages the threads 9 as most clearly shown in Figure 4. Said nut or sleeve is provided with a smooth bore outward from the threads thereof and there is thus created an annular space 12 between it and the said part 4.

The stem of the nozzle is denoted at 13 and it is internally threaded at its inner end to engage the threaded portion at 10 of the part 4. Said inner end when screwed into position enters the bore 12 and engages a packing 14 seated in the bottom of the annular space or bore 12. But the packing may be otherwise applied the whole purpose of which, however, is to provide a water-tight joint between the stem 13 and the part 4.

In assembling the nozzle the part 4 is placed in position within the fitting 1 with the flange 5 bearing against the flange 1' thereof whereupon the nut or sleeve 11 is screwed upon it and brought up against the end of the fitting and a shoulder $4^2$ of the said part 4 to just the point where there will be no longitudinal movement of the two relatively and yet permit the said nut to rotate with respect to said fitting. The nut is followed by the stem 13 which in engaging the threads at 10 seats upon the said packing 14 in a water-tight manner. Water that may be under pressure within the stem due to the constricted opening 15 at the outer end of the stem cannot back up between the stem and the part 4 and become a source of annoyance.

A gasket, not shown, overlies the margin of the valve 7 and upon the flange 5 in the manner dictated by my said patent referred to so that no leakage of water can occur between the part 4 and fitting 1. In use the entire structure made up of the part 4, the nut 11 and the stem 13 rotates with respect to the said fitting 1 and with respect to the valve 7, the latter being held by the friction of the mentioned gasket, not shown, which is clamped between the fitting 1 and the hose fitting, not shown.

The structure provided aside from the valve mechanism is believed to be new and novel in a hose nozzle and as differing from the structure of my said patent provided for holding the parts of the assembly in connected relation at all times.

The nut or sleeve 11 and the flange 5 maintain the fitting 1 and part 4 in assembled relation so that no movement other than a rotary one can take place. The threads of the stem of the tubular part 4 prevent movement of the two parts relatively, of course, when they are properly tightened through the engagement of the stem with the packing 14.

In Figure 6 a slightly different arrangement of the parts is shown. The threads are merely extended further along within the stem 13 so as to permit the latter to be screwed close to the fitting 1, the nut or sleeve 11 in this instance not being required. In order to provide a water-tight joint between the stem 13 and the part 4, the threads 9 are preferably extended nearer to the threads 10 leaving a small space between them which is filled by a band of solder 16, termed a "solder-ring" which after the parts are assembled may be used to "sweat" said parts 4 and 13 together.

Either of the methods described and shown may be used, that last described being slightly more simple in form.

I claim:

1. In a hose nozzle, in combination with a tubular fitting threaded at one end to receive into it a hose connection, and recessed to create an inner end wall, a structure including a tubular part inserted in the fitting adapted for a relative movement therein in use and having a flange at one end to engage said inner end wall of said fitting and extending at its other end from the other end of the fitting, said part being reduced in diameter outside the fitting creating a shoulder substantially flush with the end of the latter, and a member threaded upon the said reduced portion abutting against the said shoulder and said fitting securing the latter and part from relative movement other than a rotary one.

2. In a hose nozzle, in combination with a tubular fitting threaded at one end to receive into it a hose connection, and recessed to create an inner end wall, a structure including a tubular part inserted in the fitting adapted for a relative movement therein in use and having a flange at one end to engage said inner end wall of the fitting, said part being reduced in diameter outside the fitting creating a shoulder substantially flush with the end of the latter, and a member threaded upon said reduced portion abutting against the said shoulder and said fitting securing the latter and part from relative movement other than a rotary one, and a packing-ring between the tubular part and the member.

3. A hose nozzle including in its construction a tubular fitting threaded to receive a hose connection, and having an inner end wall, a tubular part lying within and extending outside the bore of the fitting and having a flange at one end to engage the said inner end wall of the latter and reduced in diameter outside the said fitting creating a shoulder lying substantially flush with the outer side of the end of the latter engaged by said flange, a member threaded upon the part and having a recess therein, the said member abutting against the fitting and said shoulder retaining said fitting between said member and the described flange of said part, a stem threaded upon the part and extending into the recess of the member, and a packing surrounding the part within the recess receiving the stem against it.

In testimony whereof I affix my signature.

LEWEN R. NELSON.